May 19, 1964     O. GRANNING     3,133,745
TANDEM SUSPENSION FOR TRACTORS AND TRAILERS
Filed May 29, 1961     3 Sheets-Sheet 2

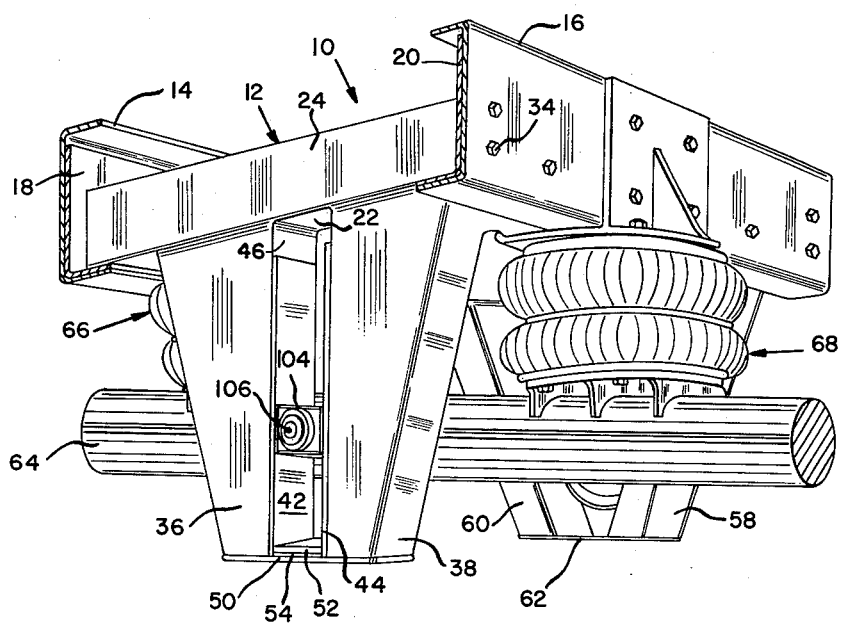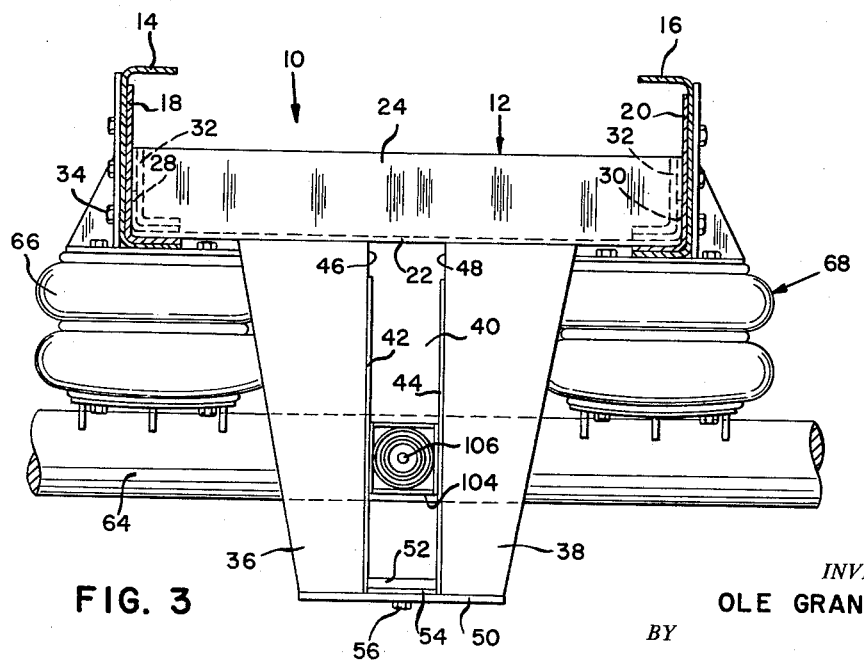

*INVENTOR.*
OLE GRANNING
BY
WILSON, SETTLE & CRAIG
ATTORNEYS

INVENTOR.
OLE GRANNING
BY
WILSON, SETTLE & CRAIG
ATTORNEYS

United States Patent Office 3,133,745
Patented May 19, 1964

3,133,745
TANDEM SUSPENSION FOR TRACTORS
AND TRAILERS
Ole Granning, Detroit, Mich., assignor to Ole Granning Trailer Service Inc., Dearborn, Mich., a corporation of Michigan
Filed May 29, 1961, Ser. No. 113,284
2 Claims. (Cl. 280—112)

This invention relates to an axle assembly, and more particularly to an axle assembly mountable on a truck tractor or trailer to provide an additional axle therefor.

It is frequently desirable to add an additional axle assembly to a truck tractor or trailer to increase the load carrying capacity of the vehcile. The maximum permissible load for each wheel of a truck is regulated by state law. If additional wheels are provided on the truck, the permissible truck load is increased thus permitting the trucker to haul a larger pay load. In addition to complying with loading regulations, it is also desirable to add an extra axle when the load is to be increased in order to prevent undue wear on the truck.

The present invention provides an axle assembly which may be mounted on a truck to provide an additional axle when desired. The unit may be mounted either on a truck tractor, making the tractor a tandem unit, or on a truck trailer as a second or third axle assembly.

It is an object of the invention to provide an axle assembly mountable on a truck tractor or trailer to provide an additional axle therefor.

Another object of the invention is to provide an axle assembly having a minimum of moving parts to thus reduce the initial cost and also the maintenance cost of the unit.

A further object of the invention is to provide an axle assembly which is capable of extensive movement to adjust to varying road conditions.

Another object is to provide an axle assembly which may be integrated with the permanent truck axles in that loads carried by all of the axles will be equalized at all times.

A further object of the invention is to provide an axle assembly having means for maintaining axle alignment to reduce tire wear and provide for greater safety of operation.

A still further object of the invention is to provide an axle assembly which is easily installed on a conventional truck body.

Other objects of this invention will appear in the following description and appended claims, reference being had to the accompanying drawings forming a part of this specification wherein like reference characters designate corresponding parts in the several views.

In the drawings:

FIGURE 1 is a perspective view of one embodiment of the axle assembly of the present invention shown mounted on a truck frame;

FIGURE 3 is a rear end elevational view of the axle assembly of FIGURE 1; and

Figure 2:
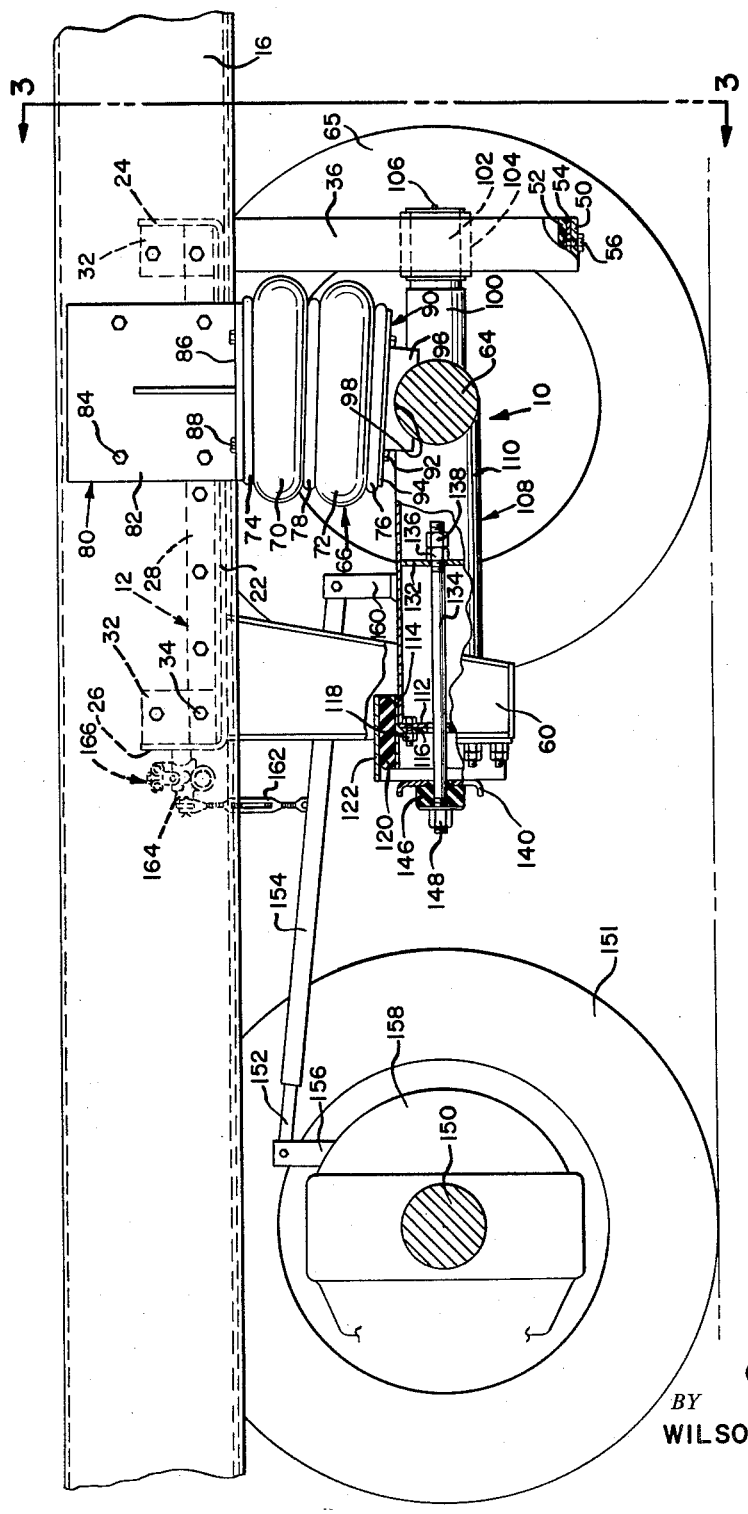
FIGURE 2 is a side elevational view of the axle assembly of FIGURE 1 with parts in section for the purpose of clarity and showing the cooperative relationship with a permanent truck axle.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the figures, it may be seen that the axle assembly 10 includes a generally rectangular axle frame 12 which is mounted on a pair of spaced apart truck frame channel members 14, 16. The channels 14, 16 are provided with reinforcing angle members 18, 20.

The axle frame 12 comprises a plate 22 which is turned up at each end to form end portions 24, 26. An angle member 28, 30 is welded to each lateral side edge of the plate 22. A corner reinforcing angle 32 is welded in each corner of the thus configured frame. The frame is secured within channels 14, 16 by bolts 34.

As may be seen in FIGURES 1 and 3, a pair of tubular legs 36, 38 extend downwardly from the rear of the frame 12. The legs are spaced apart to form a guide opening 40. Bearing plates 42, 44 are provided on the inner faces 46, 48 of the legs. The legs are joined together at their lower ends by a plate 50. A resilient bumper block 52 is provided at the bottom of the opening 40. The block 52 has a metal plate 54 vulcanized thereto and is secured to the plate 50 by a bolt 56.

Figure 4:
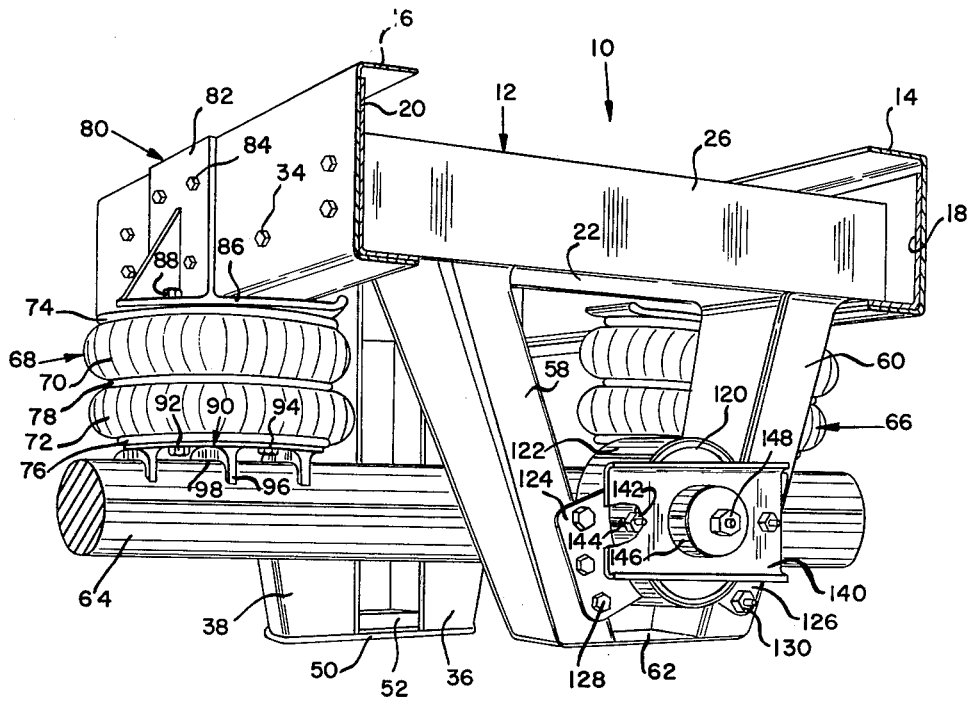
FIGURE 4 is a perspective view of the axle assembly of FIGURE 1 showing the configuration of the front portion of the assembly.

Referring to FIGURE 4, it will be seen that a pair of tubular legs 58, 60 depend from the front end of the frame 12. The legs 58, 60 are spaced apart and angled inwardly to form a V-shaped structure. The lower ends of the legs 58, 60 are secured together by a plate 62.

An axle 64, which supports a pair of rotatable wheels 65, is supported and guided between the front and rear legs of the axle frame 12 and is suspended from the truck frame by a pair of pneumatic springs 66, 68. The springs 66, 68 are of conventional structure and each comprises a pair of flexible air bags 70, 72. The bags 70, 72 have upper and lower metallic re-inforcing discs 74, 76 vulcanized thereto and a center disc 78 vulcanized to the bags to join them together. A conventional pnuematic circuit (not shown) is associated with each spring to supply the bags with the desired amount of air under pressure to maintain the bags at the proper air pressure. The proper pressure is determined by the load applied to the bags. In operation, an upward force on the bags will cause air to be expelled from the bags, permitting collapse thereof to accommodate upward movement of the axle. The control system associated with the bags will subsequently cause the air pressure within the bags to increase thus forcing the axle back downwardly to its normal position. The bags operate in a manner similar to an ordinary leaf spring with the additional capability of being automatically adjustable to accommodate different loads to the end that the axle will be maintained in the desired position with respect to the truck frame regardless of varying load conditions.

The springs 66, 68 are secured to the truck frame by means of a bracket 80. The bracket 80 has a general T-shape with one leg 82 extending upwardly and secured to the exterior surface of a truck frame channel by means of bolts 84. The horizontal member 86 of the bracket is secured to the upper disc 74 of the air springs by means of bolts 88. As will be appreciated, the springs do not have to be secured directly to the truck frame but may be secured to the axle frame 12.

The springs are secured to the axle by means of a bracket 90 which is secured to the lower disc 76 by bolts 92. Extending downwardly from the bracket plate 94 are spaced projections 96 having circular recesses 98 which are received on the axle 64. The projections 96 are welded to the axle to thus secure the axle to the springs 66, 68.

Extending rearwardly from the axle 64 is a guide spindle 100. The spindle 100 is welded to the axle at the longitudinal center thereof. The spindle 100 has a circular portion 102 of reduced diameter at its outer end. The portion 102 rotatably extends into a rectangular guide block 104 which is mounted for vertical sliding travel in the opening 40 between the legs 36, 38. A grease fitting 106 is provided for lubrication of the rotatable portion 102.

The spindle 100 permits vertical movement of the axle under the constraint of pneumatic springs 66, 68 and also permits tilting of the axle about a horizontal axis defined by the longitudinal axis of the spindle. The spindle maintains the axle in alignment by preventing lateral movement of the axle or pivoting of the axle about a vertical axis.

A drawbar 108 extends forwardly from the axle and couples the axle to the truck frame. The drawbar comprises a tubular element 110 which is welded to the axle at the longitudinal center thereof, and in axial alignment with the spindle 100. The element 110 has a plate 112 secured at its outer end. A cylindrical ring 114 is received on the outer end of the element 110 and has a plate 116 therein which abuts against the plate 112 and is secured in position by bolts 118.

An annular resilient member 120, which is preferably fabricated of rubber, is secured to the outer surface of an inner cylindrical ring 114 by vulcanization. The resilient member 120 has an outer cylindrical ring 122 vulcanized to its outer surface. The outer ring 122 has a pair of radially extending flanges 124, 126 on its outer periphery which are secured to the frame legs 58, 60 by bolts 128, 130. It will thus be appreciated that the drawbar is firmly anchored at one end to the axle and at the other end to the frame 12 thus providing a coupling between the axle and the truck.

In operation, the resilient member 120 permits the outer end of drawbar 108 to pivot upon a rise of the axle. Member 120 also permits the drawbar to rotate about its longitudinal axis, thus accommodating axle pivoting about a horizontal axis defined by the drawbar and the spindle 100. The member 120 also permits a small amount of forward and backward axle movement. Such movement is, however, guided by the guide block 104 to prevent misalignment of the axle. Whenever the axle is moved out of its normal position, the resilient member 120 urges it back towards the normal position and will re-position the axle upon cessation of the force on the axle.

Structure is also provided to prevent separation of the drawbar from the frame legs 58, 60 in the event of a failure of the resilient member 120 or loosening of the bolts holding the outer ring 122 to the frame legs. As will be noted in FIGURE 2, a plate 132 is secured as by welding within the drawbar intermediate the ends thereof. A rod 134, threaded at each end, is received within the drawbar and extends through an opening in the plate 132. Lock nuts 136, 138 are threaded on the inner end of the rod. The rod extends through openings in plates 112, 116 and terminates exteriorly of the ring 122. A generally rectangular plate 140 is received on the outer end of a rod. The plate 140 abuts against the ring 122 and is secured thereto by nuts 142 which threadingly engage studs 144 which extend through openings in the plate. The studs 144 are welded to the ring 122. A resilient washer 146 is received on the outer end of the rod 134 and the rod assembly is secured in place by a nut 148. As will be appreciated, if the ring 122 becomes separated from the drawbar or the axle frame, the rod 134 will hold the assembly in position for a period long enough to bring the vehicle to a safe stop.

The axle assembly 10 is connected to a conventional truck axle 150 having wheels 151 to equalize the load carried by each axle. As shown, a flexible telescopic member comprising elements 152, 154 extends between the axle assembly. The element 152 is pivotally secured to a bracket 156 which is mounted on differential housing 158 of the axle 150. The element 154 is pivotally connected to a bracket 160 which is secured to the drawbar 108. A turnbuckle 162 is secured at one end to the element 154 and at the other end to a lever 164 forming part of a valve assembly 166. In operation, when the axle 64 rises relative to the truck frame, the telescopic connector element 154 will rise carrying with it turnbuckle 162. Turnbuckle 162 will then operate valve lever 164 which will actuate the valve 166 to increase the air pressure in pneumatic springs 66, 68. The increased air pressure will cause axle 64 to move away from the truck frame until it is on the same horizontal plane as axle 150 thus equalizing the load between the two axles. The reverse process will take effect in the event of the lowering of axle 64 relative to the truck frame to always maintain the axles in the same horizontal plane. The axle 150, which on most trucks is suspended from a leaf type spring, will always return to a center position after being moved. Consequently, the axle 64 must be made to conform to the position of the axle 150 if the load is to be equalized.

Having thus described by invention, I claim:

1. A suspension sub-assembly for a vehicle comprising a sub-assembly frame separate from the vehicle frame, said sub-assembly frame being of a size and including structure for mounting thereof on the vehicle frame, a first axle support structure carried on the rearward end of the sub-assembly frame, said first axle support structure comprising a pair of downwardly depending spaced apart leg members, the adjacent surfaces of the leg members defining a vertical guide, a vertically slidable element received in said guide, a spring structure securable to one of the vehicle frame and sub-assembly frame intermediate the rearward and forward ends of the sub-assembly frame, an axle suspended from said spring structure, a spindle extending outwardly from the lengthwise center of the axle towards the first axle support structure, the outer end of the spindle extending rotatably into said vertically slidable element, a drawbar extending outwardly from the lengthwise center of the axle towards the forward end of the sub-assembly frame, a second axle support structure depending from the forward end of the sub-assembly frame, resilient fastening means securing the drawbar to the second support structure whereby the axle is free to move, under the constraint of the spring structure, in a vertical plane defined by the intersection of the path of the slidable element and the longitudinal axis of the spindle and may tilt about an axis defined by the longitudinal axis of the spindle.

2. A device as claimed in claim 1 and further characterized in that second fastening means are provided to secure the drawbar to the second axle support structure to prevent separation therefrom in the event of failure of the resilient fastening structure.

References Cited in the file of this patent
UNITED STATES PATENTS

| | | |
|---|---|---|
| 2,074,289 | Wagner | Mar. 16, 1937 |
| 2,132,963 | Nallinger | Oct. 11, 1938 |
| 2,393,183 | Parker | Jan. 15, 1946 |
| 2,579,556 | Drong | Dec. 25, 1951 |
| 2,637,569 | Turner | May 5, 1953 |
| 2,660,450 | Stigum et al. | Nov. 24, 1953 |
| 2,742,302 | Pointer | Apr. 17, 1956 |
| 2,756,048 | Pfeiffer | July 24, 1956 |